May 10, 1927.
C. R. SHORT
CRANK SHAFT
Filed Aug. 16, 1926
1,627,809
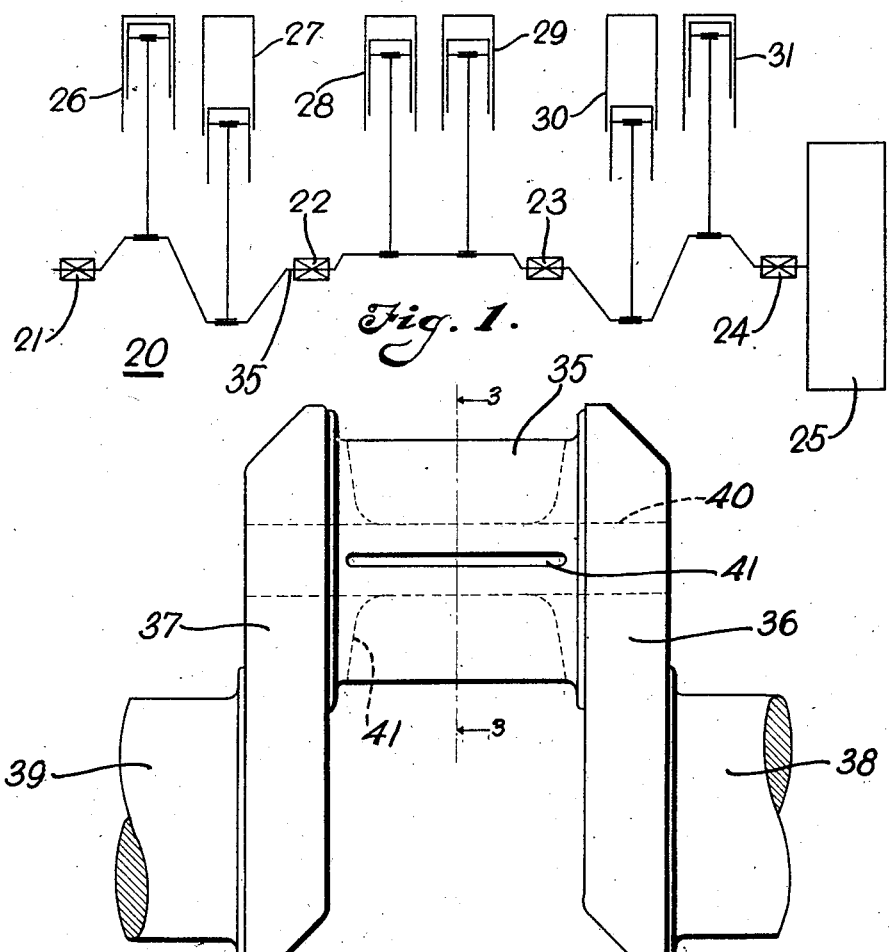
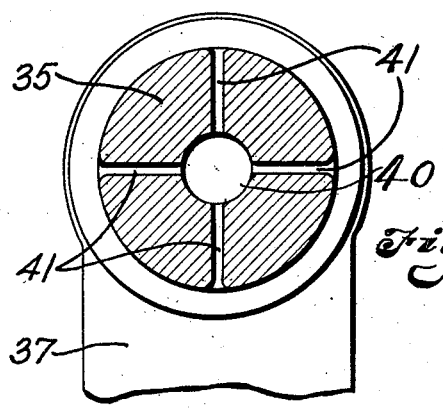
Inventor
Charles R. Short
By Blackmore, Spencer & Flint
Attorney Patented May 10, 1927.

1,627,809

UNITED STATES PATENT OFFICE.

CHARLES R. SHORT, OF DETROIT, MICHIGAN, ASSIGNOR TO GENERAL MOTORS RESEARCH CORPORATION, OF DETROIT, MICHIGAN, A CORPORATION OF DELAWARE.

CRANK SHAFT.

Application filed August 16, 1926. Serial No. 129,490.

This invention relates to improvements in crankshafts and more particularly to crankshafts of internal-combustion engines.

It is among the objects of the present invention to counteract the vibrations in a crankshaft.

This object is attained by opposing the torsional deflection of one portion of the crankshaft by the torsional deflection in another portion of the crankshaft.

Further objects and advantages of the present invention will be apparent from the following description, reference being had to the accompanying drawings, wherein a preferred form of embodiment of the present invention is clearly shown.

In the drawings:

Fig. 1 is a diagrammatic view showing a six cylinder crankshaft with the flywheel and pistons assembled thereon and the four main bearings in which the crankshaft is journaled.

Fig. 2 is a fragmentary detail view of the one main journal of the crankshaft which is of greater torsional flexibility than the other journal of the crankshaft.

Fig. 3 is a cross-sectional view taken along the lines 3—3 of Fig. 2.

Referring to the drawings and particularly to Fig. 1, the numeral 20 designates the crankshaft as a whole, this crankshaft being shown provided with main bearings 21, 22, 23 and 24. The main bearing 21 is positioned adjacent the front end of the crankshaft while the main bearing 24 is positioned adjacent the flywheel 25 mounted on the rear end of the crankshaft. A six cylinder engine is illustrated in the diagram the pistons of cylinders 26 and 27 being connected with the crankshaft throws between bearings 21 and 22, while the pistons of cylinders 28, and 29 are connected with throws of the crankshaft between the main bearings 22 and 23 and pistons of cylinders 30 and 31 are connected to the throws between bearings 23 and 24 respectively.

In constructing a crankshaft in which torsional deflections in one portion thereof counteract or oppose the torsional deflections in the other part of the crankshaft it is essential that the two parts of the shaft do not have the same frequency or a multiple of the same frequency within the driving range. For this reason it is preferable to construct the crankshaft in such a manner that a main intermediate journal, which is of greater torsional flexibility than the others, connects a portion of the crankshaft which includes a lesser number of throws on one side thereof to the portion of the shaft having a greater number of throws.

In the present case, that is, in a six cylinder crankshaft this particular journal is preferably positioned in bearing 22 thereby providing two crank throws on one side of said journal and four crank throws on the other, In Figs. 2 and 3 a detailed view of a construction of journal whereby the desired result may be secured is illustrated. Numeral 35 designates one journal of a crankshaft provided with arm 36 and 37 at opposite ends thereof, the crank arm 36 having the crank pin 38 thereon to which the piston of cylinder 28 is connected. The crank arm 37 has a crank pin 39 thereon to which is connected the piston of cylinder 27. The journal 35 may have a central bore 40 that extends through the crank arms 36 and 37, as shown in Fig. 2. A plurality of slots 41 radiating from the bore 40 to the exterior of the journal are provided, as is clearly illustrated in Fig. 3. The journal, slotted as described, will be less stiff or of greater torsional flexibility than the others which may be of substantially the same diameter but not slotted.

In operation the crankshaft portions on each side of bearing 22 have different natural frequencies of torsional vibration. Thus, when the torsion vibrations of one portion are impressed upon another portion of different frequency, opposing forces will prevent the building up of violent vibrations in the entire shaft assembly provided the torsionally elastic connection between the portions is properly selected.

It will, of course, be understood that the journal 35 of the crankshaft 20 is so constructed that even with the provision of the slots 21 it still will be of sufficient strength to transmit full torque from the engine to the driven means.

One advantage of the present invention is that no additional mass is added to the crankshaft for purposes of dampening or otherwise checking vibrations. The effect is obtained because the two portions of the crankshaft have different frequencies which prevent the building up of a torsional period in the entire shaft assembly.

While the form of embodiment of the present invention as herein disclosed, constitutes a preferred form, it is to be understood that other forms might be adopted, all coming within the scope of the claims which follow.

What is claimed is as follows:

1. A crankshaft comprising portions secured together by means coaxial with the crankshaft and of greater torsional flexibility than other portions of said crankshaft.

2. A crankshaft comprising two sections each including main journal portions, said sections being secured together by means coaxial with said journal portions and of greater torsional flexibility.

3. A crank shaft comprising a plurality of alined main journals one of which is of greater torsional flexibility than the others, and has crank throws on each side thereof.

4. A crankshaft comprising a plurality of main journals one of which is slotted so as to be of greater torsional flexibility than the others.

5. A crank shaft comprising two sections each including crank throws one of said sections having a lower natural frequency of torsional vibration than the other, and means coaxial with the crank shaft securing said sections together said means being of greater torsional flexibility than either of the two portions of the crankshaft.

6. A crankshaft comprising a plurality of main journal portions, one of which is slotted so as to be of greater torsional flexibility than the others and so arranged that the section of the crankshaft on one side of the slotted journal has a greater natural frequency of torsional vibration than the section of the crankshaft on the opposite side thereof.

In testimony whereof I affix my signature.

CHARLES R. SHORT.